(12) United States Patent
Curt et al.

(10) Patent No.: US 8,775,109 B2
(45) Date of Patent: Jul. 8, 2014

(54) METHOD AND APPARATUS FOR A DEMAND MANAGEMENT MONITORING SYSTEM

(75) Inventors: Walter Curt, Harrisonburg, VA (US); Christopher Mullins, Penn Laird, VA (US)

(73) Assignee: Power Monitors, Inc., Mount Crawford, VA (US)

( * ) Notice: Subject to any disclaimer, the term of this patent is extended or adjusted under 35 U.S.C. 154(b) by 343 days.

(21) Appl. No.: 13/193,910

(22) Filed: Jul. 29, 2011

(65) Prior Publication Data

US 2012/0029715 A1 Feb. 2, 2012

Related U.S. Application Data

(60) Provisional application No. 61/369,045, filed on Jul. 29, 2010.

(51) Int. Cl.
*G01R 19/00* (2006.01)
*G06F 1/28* (2006.01)

(52) U.S. Cl.
USPC .............................................. 702/65; 702/58

(58) Field of Classification Search
USPC ............ 700/286, 291, 292, 293, 295; 702/57, 702/58, 59, 60, 61, 62, 64, 65
See application file for complete search history.

(56) References Cited

U.S. PATENT DOCUMENTS

| | | |
|---|---|---|
| 2,855,916 A | 10/1958 | Foster |
| 3,516,063 A | 6/1970 | Arkin et al. |
| 4,067,054 A | 1/1978 | Clark |
| 4,540,182 A | 9/1985 | Clement |
| 4,558,275 A | 12/1985 | Borowy et al. |
| 4,731,574 A | 3/1988 | Melbert |
| 4,731,575 A | 3/1988 | Sloan |
| 4,800,492 A | 1/1989 | Johnson et al. |
| 5,083,638 A | 1/1992 | Schneider |
| 5,107,202 A | 4/1992 | Renda |
| 5,181,026 A * | 1/1993 | Granville ................. 340/870.28 |
| 5,241,283 A | 8/1993 | Sutterlin |
| 5,410,735 A | 4/1995 | Borchardt et al. |
| 5,420,799 A | 5/1995 | Peterson et al. |
| 5,488,202 A | 1/1996 | Baitz et al. |
| 5,491,463 A | 2/1996 | Sargeant et al. |
| 5,565,783 A | 10/1996 | Lau et al. |

(Continued)

FOREIGN PATENT DOCUMENTS

| | | |
|---|---|---|
| CN | 2765183 Y | 3/2006 |
| DE | 102007026290 | 7/2008 |

(Continued)

OTHER PUBLICATIONS

Chinese Office Action issued on Jul. 6, 2010 Chinese Patent Appl. No. 200780015356.0 (10 pages).

(Continued)

*Primary Examiner* — Charles Kasenge
(74) *Attorney, Agent, or Firm* — Dinsmore & Shohl LLP

(57) ABSTRACT

A demand management monitoring system including a remote measurement device including a microprocessor for calculating RMS voltage data from digital samples and a wireless communications device, and a server system including a database configured to store the RMS voltage data from the remote measurement device.

11 Claims, 9 Drawing Sheets

(56) References Cited

U.S. PATENT DOCUMENTS

| | | | |
|---|---|---|---|
| 5,583,801 A | 12/1996 | Croyle et al. | |
| 5,602,794 A | 2/1997 | Javanifard et al. | |
| 5,617,286 A | 4/1997 | Jenkins | |
| 5,641,898 A | 6/1997 | Chang | |
| 5,659,453 A | 8/1997 | Russell et al. | |
| 5,725,062 A | 3/1998 | Fronek | |
| 5,726,646 A | 3/1998 | Bane et al. | |
| 5,732,039 A | 3/1998 | Javanifard et al. | |
| 5,752,046 A | 5/1998 | Oprescu et al. | |
| 5,767,735 A | 6/1998 | Javanifard et al. | |
| 5,781,473 A | 7/1998 | Javanifard et al. | |
| 5,796,631 A | 8/1998 | Iancu et al. | |
| 5,831,538 A | 11/1998 | Schena | |
| 5,898,158 A | 4/1999 | Shimizu et al. | |
| 5,905,616 A | 5/1999 | Lyke | |
| 5,917,428 A * | 6/1999 | Discenzo et al. | 340/870.01 |
| 5,937,386 A | 8/1999 | Frantz | |
| 5,939,974 A | 8/1999 | Heagle et al. | |
| 5,943,226 A | 8/1999 | Kim | |
| 6,005,758 A | 12/1999 | Spencer et al. | |
| 6,005,759 A * | 12/1999 | Hart et al. | 361/66 |
| 6,022,315 A | 2/2000 | Iliff | |
| 6,034,859 A | 3/2000 | Baumgärtl | |
| 6,049,880 A | 4/2000 | Song | |
| 6,091,337 A | 7/2000 | Arshad et al. | |
| 6,107,862 A | 8/2000 | Mukainakano et al. | |
| 6,115,695 A | 9/2000 | Kern | |
| 6,151,229 A | 11/2000 | Taub et al. | |
| 6,169,406 B1 | 1/2001 | Peschel | |
| 6,212,049 B1 | 4/2001 | Spencer et al. | |
| 6,222,443 B1 | 4/2001 | Beeson et al. | |
| 6,307,425 B1 | 10/2001 | Chevallier et al. | |
| 6,313,394 B1 | 11/2001 | Shugar et al. | |
| 6,317,031 B1 | 11/2001 | Rickard | |
| 6,356,426 B1 | 3/2002 | Dougherty | |
| 6,360,177 B1 | 3/2002 | Curt et al. | |
| 6,369,642 B1 | 4/2002 | Zeng | |
| 6,384,348 B1 | 5/2002 | Haga et al. | |
| 6,415,244 B1 | 7/2002 | Dickens et al. | |
| 6,437,692 B1 | 8/2002 | Petite et al. | |
| 6,516,279 B1 * | 2/2003 | Jansen et al. | 702/66 |
| 6,545,482 B1 | 4/2003 | Fedirchuk et al. | |
| 6,545,529 B2 | 4/2003 | Kim | |
| 6,603,218 B1 | 8/2003 | Aisa | |
| 6,628,496 B2 | 9/2003 | Montjean | |
| 6,633,163 B2 | 10/2003 | Fling | |
| 6,633,823 B2 | 10/2003 | Bartone et al. | |
| 6,647,024 B1 | 11/2003 | Dombkowski et al. | |
| 6,653,945 B2 | 11/2003 | Johnson et al. | |
| 6,687,680 B1 | 2/2004 | Iguchi et al. | |
| 6,690,594 B2 | 2/2004 | Amarillas et al. | |
| 6,704,568 B2 | 3/2004 | Montjean | |
| 6,734,682 B2 | 5/2004 | Tallman et al. | |
| 6,789,206 B1 | 9/2004 | Wierzbicki et al. | |
| 6,792,337 B2 | 9/2004 | Blackett et al. | |
| 6,836,099 B1 | 12/2004 | Amarillas et al. | |
| 6,842,719 B1 | 1/2005 | Fitzpatrick et al. | |
| 6,866,193 B1 | 3/2005 | Shimizu et al. | |
| 6,912,678 B1 | 6/2005 | Floro et al. | |
| 6,928,564 B2 | 8/2005 | Tada et al. | |
| 6,931,445 B2 | 8/2005 | Davis | |
| 6,944,058 B2 | 9/2005 | Wong | |
| 6,957,158 B1 | 10/2005 | Hancock et al. | |
| 6,961,641 B1 | 11/2005 | Forth et al. | |
| 6,993,417 B2 | 1/2006 | Osann, Jr. | |
| 6,995,603 B2 | 2/2006 | Chen et al. | |
| 7,004,784 B2 | 2/2006 | Castle | |
| 7,009,379 B2 | 3/2006 | Ramirez | |
| 7,130,722 B2 | 10/2006 | Soni | |
| 7,135,850 B2 | 11/2006 | Ramirez | |
| 7,177,824 B2 | 2/2007 | Sabongi et al. | |
| 7,209,804 B2 * | 4/2007 | Curt et al. | 700/286 |
| 7,242,109 B2 | 7/2007 | Beeren | |
| 7,348,769 B2 | 3/2008 | Ramirez | |
| 7,412,338 B2 * | 8/2008 | Wynans et al. | 702/61 |
| 7,460,467 B1 | 12/2008 | Corcoran | |
| 7,462,952 B2 | 12/2008 | Bailey | |
| 7,489,138 B2 * | 2/2009 | Yu et al. | 324/536 |
| 7,669,061 B2 * | 2/2010 | Curt et al. | 713/300 |
| 7,769,149 B2 | 8/2010 | Berkman | |
| 7,795,877 B2 | 9/2010 | Radtke et al. | |
| 7,804,280 B2 | 9/2010 | Deaver, Sr. et al. | |
| 7,818,159 B2 * | 10/2010 | Kim et al. | 703/18 |
| 7,873,441 B2 * | 1/2011 | Synesiou et al. | 700/286 |
| 7,956,673 B2 | 6/2011 | Pan | |
| 8,121,801 B2 * | 2/2012 | Spanier et al. | 702/61 |
| 8,125,345 B2 * | 2/2012 | Curt et al. | 340/652 |
| 8,160,824 B2 * | 4/2012 | Spanier et al. | 702/57 |
| 8,305,737 B2 * | 11/2012 | Ewing et al. | 361/622 |
| 8,362,789 B2 * | 1/2013 | Collins et al. | 324/649 |
| 8,494,661 B2 * | 7/2013 | Ewing et al. | 700/22 |
| 2002/0008566 A1 | 1/2002 | Taito et al. | |
| 2002/0043969 A1 | 4/2002 | Duncan et al. | |
| 2002/0063635 A1 | 5/2002 | Shincovich | |
| 2002/0082924 A1 | 6/2002 | Koether | |
| 2002/0112250 A1 | 8/2002 | Koplar et al. | |
| 2002/0130701 A1 | 9/2002 | Kleveland | |
| 2002/0143482 A1 | 10/2002 | Karanam et al. | |
| 2002/0182570 A1 | 12/2002 | Croteau et al. | |
| 2003/0046377 A1 | 3/2003 | Daum et al. | |
| 2003/0069796 A1 | 4/2003 | Elwood et al. | |
| 2003/0126735 A1 | 7/2003 | Taniguchi et al. | |
| 2003/0167178 A1 | 9/2003 | Jarman et al. | |
| 2003/0197989 A1 | 10/2003 | Nojima | |
| 2003/0224784 A1 | 12/2003 | Hunt et al. | |
| 2003/0225713 A1 | 12/2003 | Atkinson et al. | |
| 2004/0008023 A1 | 1/2004 | Jang et al. | |
| 2004/0024913 A1 | 2/2004 | Ikeda et al. | |
| 2004/0124247 A1 | 7/2004 | Watters | |
| 2004/0128085 A1 | 7/2004 | Ramirez | |
| 2004/0138786 A1 | 7/2004 | Blackett et al. | |
| 2004/0138835 A1 | 7/2004 | Ransom et al. | |
| 2004/0210621 A1 | 10/2004 | Antonellis | |
| 2004/0242087 A1 | 12/2004 | Hoshina | |
| 2005/0049921 A1 | 3/2005 | Tengler et al. | |
| 2005/0052186 A1 | 3/2005 | Grube | |
| 2005/0065743 A1 * | 3/2005 | Cumming et al. | 702/62 |
| 2005/0138432 A1 | 6/2005 | Ransom et al. | |
| 2005/0144099 A1 | 6/2005 | Deb et al. | |
| 2005/0154490 A1 | 7/2005 | Blaine et al. | |
| 2005/0154499 A1 | 7/2005 | Aldridge et al. | |
| 2005/0212526 A1 | 9/2005 | Blades | |
| 2005/0216349 A1 | 9/2005 | Vaseloff et al. | |
| 2005/0256774 A1 | 11/2005 | Clothier et al. | |
| 2005/0273183 A1 | 12/2005 | Curt et al. | |
| 2006/0047543 A1 | 3/2006 | Moses | |
| 2006/0061480 A1 | 3/2006 | Bowman | |
| 2006/0062400 A1 | 3/2006 | Chia-Chun | |
| 2006/0071776 A1 | 4/2006 | White, II et al. | |
| 2006/0087322 A1 | 4/2006 | McCollough, Jr. | |
| 2006/0087783 A1 | 4/2006 | Holley | |
| 2006/0098371 A1 | 5/2006 | Wambsganss et al. | |
| 2006/0111040 A1 | 5/2006 | Jenkins et al. | |
| 2006/0114121 A1 | 6/2006 | Cumeralto et al. | |
| 2006/0145685 A1 | 7/2006 | Ramirez | |
| 2006/0158177 A1 | 7/2006 | Ramirez | |
| 2006/0176630 A1 | 8/2006 | Carlino et al. | |
| 2006/0181838 A1 | 8/2006 | Ely | |
| 2006/0190140 A1 | 8/2006 | Soni | |
| 2006/0190209 A1 | 8/2006 | Odom | |
| 2006/0218057 A1 | 9/2006 | Fitzpatrick et al. | |
| 2006/0244518 A1 | 11/2006 | Byeon et al. | |
| 2006/0271244 A1 | 11/2006 | Cumming et al. | |
| 2006/0271314 A1 | 11/2006 | Hayes | |
| 2007/0007968 A1 * | 1/2007 | Mauney et al. | 324/538 |
| 2007/0010916 A1 | 1/2007 | Rodgers et al. | |
| 2007/0053216 A1 | 3/2007 | Alenin | |
| 2007/0064622 A1 | 3/2007 | Bi et al. | |
| 2007/0080819 A1 | 4/2007 | Marks et al. | |
| 2007/0126569 A1 | 6/2007 | Dagci | |
| 2007/0129087 A1 | 6/2007 | Bell | |
| 2007/0286089 A1 | 12/2007 | Nasle et al. | |
| 2007/0290845 A1 | 12/2007 | Benjelloun et al. | |
| 2008/0024096 A1 | 1/2008 | Pan | |

(56) References Cited

U.S. PATENT DOCUMENTS

| | | |
|---|---|---|
| 2008/0030317 A1 | 2/2008 | Bryant |
| 2008/0036472 A1* | 2/2008 | Collins et al. ............... 324/649 |
| 2008/0042731 A1 | 2/2008 | Daga et al. |
| 2008/0106425 A1 | 5/2008 | Deaver et al. |
| 2008/0129307 A1* | 6/2008 | Yu et al. ..................... 324/522 |
| 2008/0159244 A1 | 7/2008 | Hunziker |
| 2008/0224617 A1 | 9/2008 | Keller et al. |
| 2008/0249723 A1 | 10/2008 | McAllister et al. |
| 2008/0312851 A1* | 12/2008 | Kagan et al. ................. 702/60 |
| 2009/0102680 A1 | 4/2009 | Roos |
| 2009/0115426 A1 | 5/2009 | Muench, Jr. et al. |
| 2009/0146839 A1 | 6/2009 | Reddy et al. |
| 2009/0167308 A1 | 7/2009 | Lomes |
| 2009/0167418 A1 | 7/2009 | Raghavan |
| 2009/0187285 A1* | 7/2009 | Yaney et al. ................. 700/292 |
| 2009/0296488 A1 | 12/2009 | Nguyen et al. |
| 2010/0074034 A1 | 3/2010 | Cazzaniga |
| 2010/0244935 A1 | 9/2010 | Kim et al. |
| 2010/0295692 A1* | 11/2010 | Bjorn ........................... 340/650 |
| 2010/0324845 A1* | 12/2010 | Spanier et al. ................. 702/62 |
| 2010/0328849 A1* | 12/2010 | Ewing et al. ................. 361/622 |
| 2012/0139335 A1 | 6/2012 | Holland |
| 2012/0154023 A1 | 6/2012 | Pan et al. |
| 2012/0181095 A1 | 7/2012 | Lopez |

FOREIGN PATENT DOCUMENTS

| | | |
|---|---|---|
| EP | 0382929 | 12/1989 |
| EP | 0780515 | 6/1997 |
| FR | 2797356 | 2/2001 |
| JP | S64-041540 | 2/1989 |
| JP | 2501513 | 5/1990 |
| JP | 2154157 | 6/1990 |
| JP | 6074783 | 3/1994 |
| JP | H07-032000 | 2/1995 |
| JP | 08101246 | 4/1996 |
| JP | 09107318 | 4/1997 |
| JP | 10271651 | 10/1998 |
| JP | 2000171492 | 6/2000 |
| JP | 2002199625 | 7/2002 |
| JP | 2003069731 | 7/2003 |
| JP | 2004088771 | 3/2004 |
| JP | 2004320228 | 11/2004 |
| JP | 2005190481 | 7/2005 |
| JP | 2006344144 | 12/2006 |
| JP | 2007020268 | 1/2007 |
| JP | 2007214784 | 8/2007 |
| WO | WO0106336 | 1/2001 |
| WO | WO2006132757 | 12/2006 |
| WO | WO2007116835 | 10/2007 |

OTHER PUBLICATIONS

Communication Cable Inflator/Gas Pressure Centralized Monitoring and Management System, on pp. 44-46, 49 in No. 2 vol. 18 of Automation Techniques and Application in Hellongjiang—Summary attached to Chinese Office Action for Appl. No. 200780015356.0 dated Jul. 6, 2010 as Reference No. 1—See p. 7 (1 page).

European Examination Report issued on Feb. 5, 2011 for European Patent Appl. No. 07 758 717.8—2006 (4 pages).

Chinese Office Action issued on Sep. 28, 2011 for Chinese Patent Appl. No. 200880005285.0 (16 pages).

Chinese Office Action issued on Nov. 14, 2012 for Chinese Patent Appl. No. 200880005285.0 (8 pages).

International Search Report and Written Opinion issued on Jul. 8, 2008 for International Patent Appl. No. PCT/US08/50583 (11 pages).

International Search Report and Written Opinion issued on Jul. 7, 2008 for International Patent Appl. No. PCT/US04/32880 (9 pages).

International Search Report and Written Opinion issued on Feb. 11, 2008 for International Patent Appl. No. PCT/US07/64196 (9 pages).

International Search Report and Written Opinion issued on Mar. 3, 2008 for International Patent Appl. No. PCT/US07/77418 (9 pages).

International Search Report and Written Opinion issued on Jul. 23, 2008 for International Patent Appl. No. PCT/US08/55613 (7 pages).

International Search Report and Written Opinion issued on Jul. 31, 2008 for International Patent Appl. No. PCT/US08/56008 (10 pages).

International Search Report and Written Opinion issued on Sep. 26, 2008 for International Patent Appl. No. PCT/US08/70879 (8 pages).

International Search Report and Written Opinion issued on Oct. 3, 2008 for International Patent Appl. No. PCT/US08/70881 (8 pages).

International Search Report and Written Opinion issued on May 8, 2009 for International Patent Appl. No. PCT/US09/35693 (5 pages).

Japanese Office Action issued on Sep. 4, 2012 for Japanese Patent Appl. No. P2009-545014 (8 pages).

Japanese Office Action issued on Feb. 14, 2012 for Japanese Patent Appl. No. P2009-500631 (6 pages).

International Search Report and Written Opinion issued on Jun. 3, 2008 for International Patent Appl. No. PCT/US04/26874 (5 pages).

International Search Report and Written Opinion issued on Nov. 2, 2005 for International Patent Appl. No. PCT/US04/32878 (5 pages).

\* cited by examiner

METHOD AND APPARATUS FOR A DEMAND MANAGEMENT MONITORING SYSTEM

RELATED APPLICATIONS

This application claims priority to U.S. Provisional Application Ser. No. 61/369,045, filed Jul. 29, 2010, for Method and Apparatus for A Demand Management Monitoring System.

BACKGROUND

Increased demand on the electric distribution grid increases the need for more careful management of system voltage, especially with regards to peak demand. Over a 24 hour period, the peak power consumed may be much higher than the average power. Since transformers, wire, and other infrastructure may be sized for the highest power, not the average power, increases in peak demand require equipment capable of handling that peak demand, such as larger transformers and so on. Conversely, reducing the peak demand allows utilities to postpone the upsizing of infrastructure in the face of rising total demand. Utilities may purchase power at much higher rates during times of peak demand, due to typical contract agreements. Reducing power consumption during times of peak demand may have larger financial benefit than reducing consumption at other times. Flattening the demand curve may have multiple benefits for utilities, and may reduce the need for extra generation as loading increases.

One technique for reducing demand is Conservation Voltage Regulation (CVR). With CVR, the distribution system voltage is reduced during times of peak demand. Resistive loads may consume less power when the voltage is reduced. Power consumption may be proportional to the square of the voltage for many loads, so a 1% reduction in voltage can produce a larger than 1% change in power consumption. Reductions of between 2% and 10% of total power have been achieved with CVR techniques.

To implement CVR, utilities may need much finer control over the distribution system voltage, and the voltage delivered to customers. To accomplish this, devices may be required both to adjust and measure the distribution line voltage at many strategic locations. Voltage measurements may be required for two reasons. First, actual voltage levels may be needed as part of a closed-loop feedback system, so a centralized Demand Management System can make decisions about how to adjust voltage regulators and other management devices. These voltage readings may typically be used in conjunction with system models and historical patterns, and after suitable calculations, commands may be sent to voltage regulators, capacitor banks, and so on. Second, voltage measurements may be needed to insure that regulatory voltage limits are not crossed. For example, as part of a CVR system, the voltage is typically lowered during times of peak demand, leaving much less safety margin. Regulatory limits dictate how low a voltage is allowed, and monitoring may be required to insure that these limits are met. These limits are applied at the point of delivery to customers, which may typically be the service entrance or revenue meter location.

Traditional sensors may be too slow for real-time systems, for example, those based on slow power line carrier systems, or many Automated Meter Reading (AMR) systems, or too bulky and expensive for widespread or residential deployment. Existing cellular radio solutions may not be practical for use in residential locations, due to the size and obtrusiveness of the hardware. In addition, existing systems have limited, or no, provision for storing and analyzing historical voltage data.

SUMMARY

In various embodiments, a system, method, and apparatus are provided for demand management monitoring in a power distribution system.

In one embodiment, a demand management monitoring system includes a remote measurement device where the remote measurement device includes a microprocessor configured to calculate RMS voltage data from digital samples and a wireless communications device, and a server system which includes a database configured to store the RMS voltage data from the remote measurement device.

Additional features and advantages are described herein, and will be apparent from, the following Detailed Description and the figures.

DETAILED DESCRIPTION

In various embodiments as illustrated in FIGS. 1-9, a remote measurement device measures voltage levels and ancillary data at a location in a power distribution system and transmits the data to a server system to be stored in a database and made accessible through a web front end and an external interface.

Figure 1:
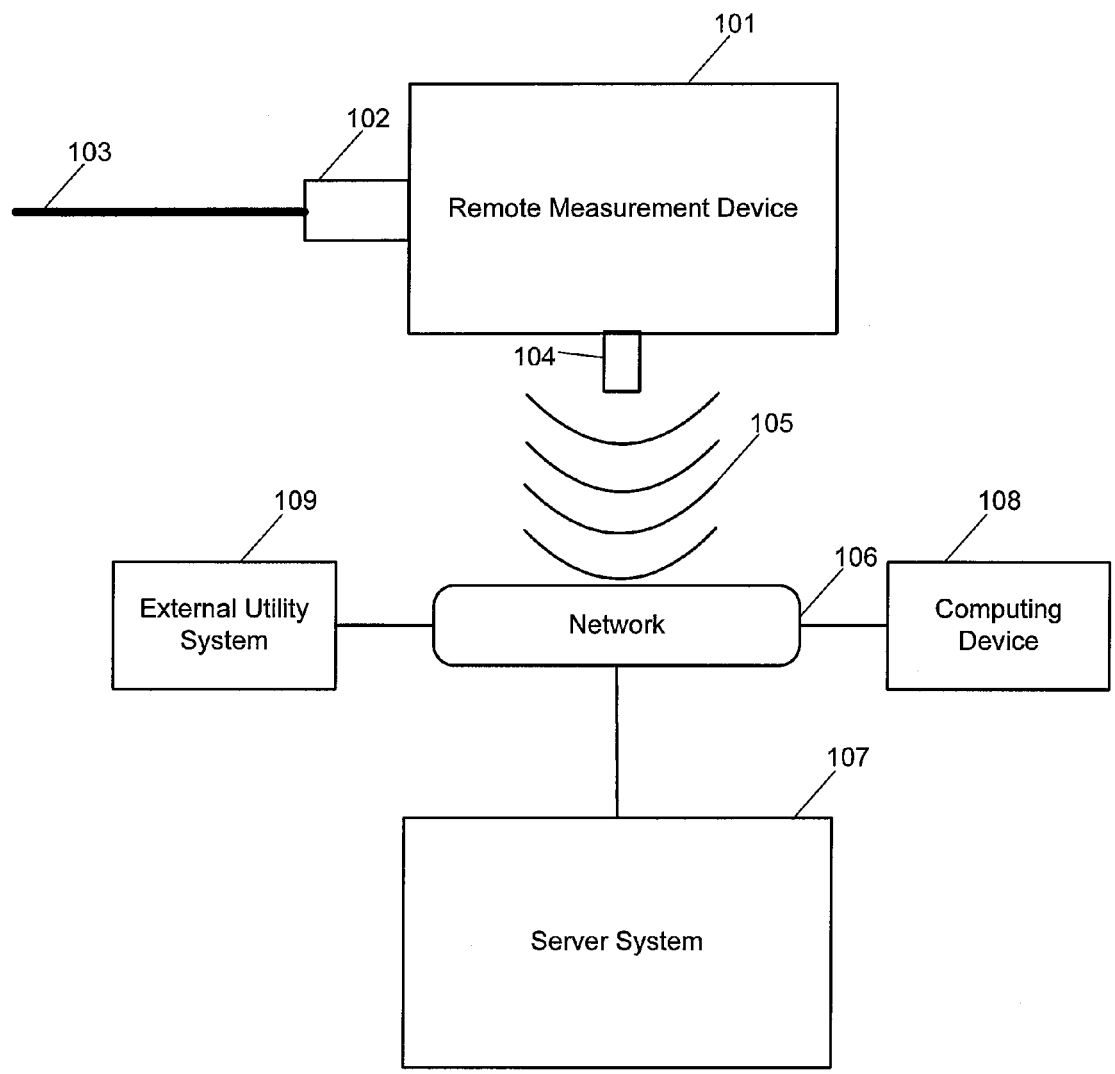
FIG. 1 depicts an exemplary overview diagram of system for demand management monitoring in a power distribution system.

FIG. 1 depicts an exemplary overview diagram of system for demand management monitoring in a power distribution system. The system may include a remote measurement device 101 and a server system 107. The remote measurement device 101 may be installed in a power distribution system, and may receive voltage from a powerline 103 through a voltage input 102. The remote measurement device 101 may use a wireless communications device 104 to communicate, using wireless signals 105, with the server system 107, through a network 106. The network 106 may be, for example, the Internet. A computing device 108 and an external utility system 109 may access the server system 107, for example, through the network 106.

Figure 2:
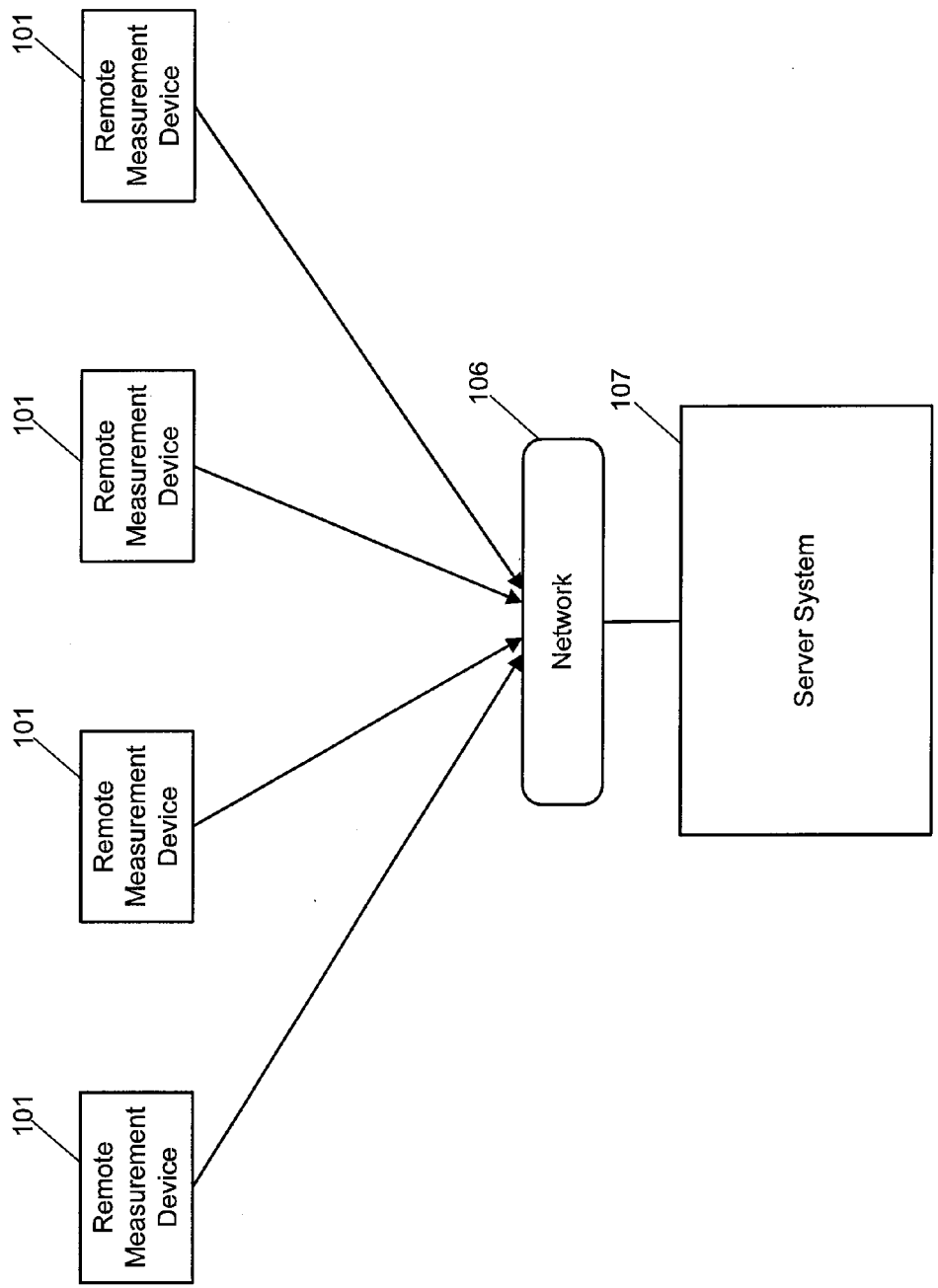
FIG. 2 depicts exemplary diagram of system for demand management monitoring in a power distribution system including multiple remote measurement devices.

FIG. 2 depicts exemplary diagram of system for demand management monitoring in a power distribution system including multiple remote measurement devices. Multiple remote measurement devices 101 may be installed at strategic locations in a power distribution system. The server system 107 may receive data from, and send data to, any of the remote measurement devices 101. Data received from the remote measurement devices 101, such as, for example, voltage readings, including RMS voltage, may be stored by the server system 107, for example, in a database.

Figure 3:
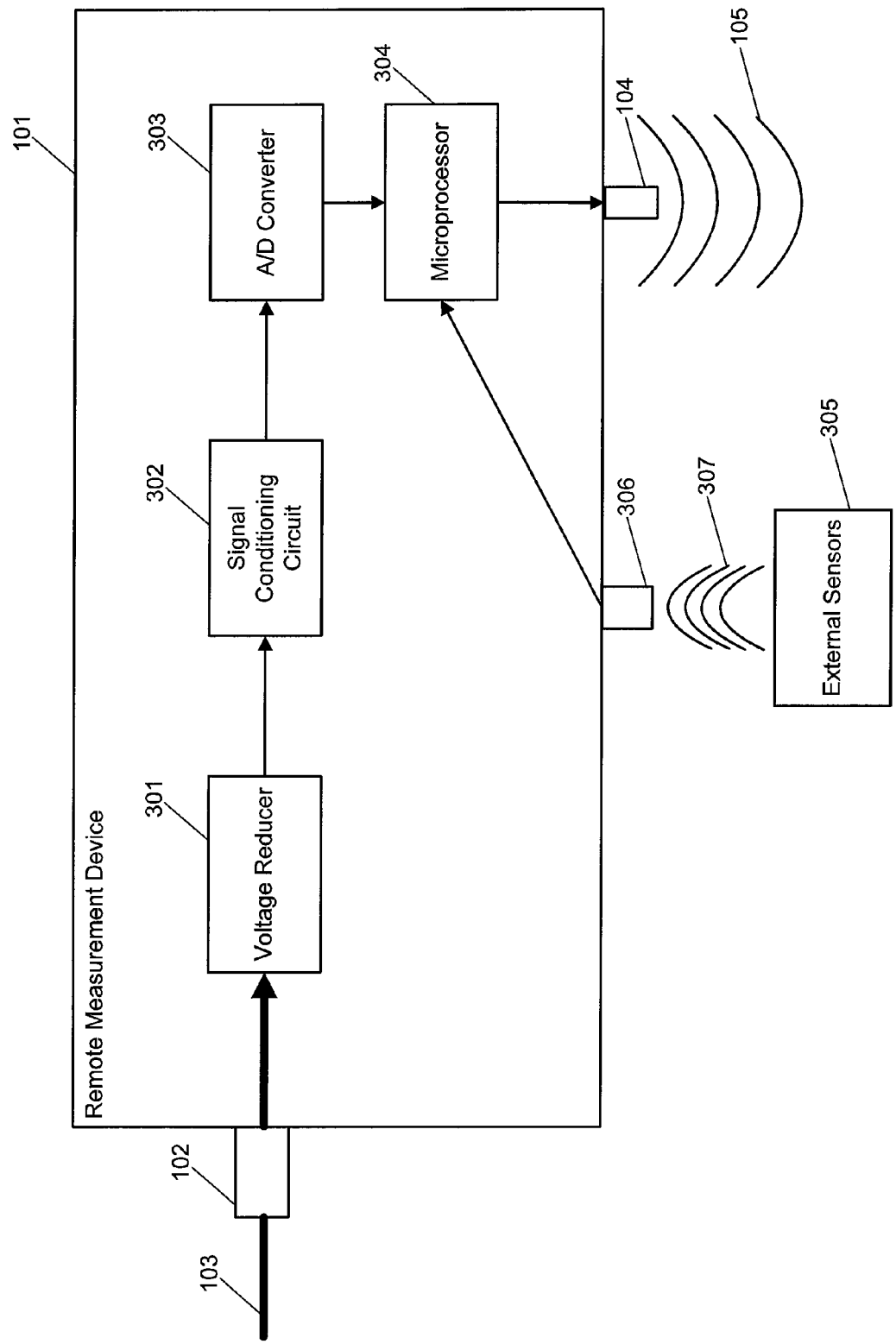
FIG. 3 depicts an exemplary diagram of a remote measurement device.

FIG. 3 depicts an exemplary diagram of a remote measurement device. The remote measurement device 101 may include the voltage input 102 for the powerline 103, a voltage reducer 301, a signal conditioning circuit 302, an Analog to Digital (A/D) convertor 303, a microprocessor 304, a wireless communications device 104, and a low power wireless communications device 306. The remote measurement device 101 may be contained in a small size and form factor, such as, for example, in a standard meter base adapter. This may allow the remote measurement device 101 to be placed between a residential meter base and revenue meter, without installing a large amount of hardware. Installing the remote measurement device 101 in a revenue meter may make it easier to perform voltage measurements required to ensure compliance with regulatory voltage limits, as the voltage drop in the service drop from the pole to the meter base must be included in the measurements.

The voltage reducer 301 may be any suitable device for reducing the voltage received by the voltage input 102 from the powerline 103. For example, the voltage reducer 301 may be a resistive divider circuit. The signal conditioning circuit 302 may be any suitable device for conditioning the reduced voltage signal from the voltage reducer 301. For example, the voltage reducer 301 may be a low-pass filter.

The A/D convertor 303 may be any suitable device for digitizing an analog signal. The A/D converter 303 may receive the voltage signal and convert the voltage signal into a digital signal including digital samples, using any suitable sample rate. The digital signal from the A/D converter 303 may be sent to the microprocessor 304.

The microprocessor 304 may be any suitable device for performing computation on received data. For example, the microprocessor 304 may be a low-voltage CPU, an FPGA, a DSP, or any other high-speed programmable logic device. The microprocessor 304 may read A/D values from the digital signal, and compute RMS voltage from the raw data. The microprocessor 304 may also be capable of capable of direct waveform sampling, enabling the computation of harmonics, waveform capture, flicker, and other PQ metrics.

Alternatively, the remote measurement device 101 may use an energy monitoring integrated circuit (IC), which may be used generally in revenue metering applications. The RMS voltage may be read directly from the energy monitoring IC.

The wireless communications device 104 may be any suitable device for wireless communication and data transmission, including, for example, a digital cellular modem or a Wi-Fi device using any suitable wireless protocol. The wireless communications device 104 may be connected to the microprocessor 304, and may send data to and receive data from the server system 107, through, for example, the network 106. The microprocessor 304 may be a separate processor from the wireless communications device 104, or the microprocessor 104 may be embedded in the wireless communications device 104 and act as both a processor for the wireless communications device 104 and an RMS processor, reading voltage data directly.

The remote measurement device 101 may also include hardware capable of current measurements, such as, for example, Rogowski coil transducers with hardware or software integration.

The low power wireless communications device 306 may be any suitable device for wireless communication and data transmission, including, for example, RF, Wi-Fi or Bluetooth devices. The low power wireless communications 306 may wirelessly communication with various external sensors 305, using, for example, a low power wireless protocol. The low power wireless communications device 306 may be part of, or separate from, the wireless communications device 104.

The external sensors 305 may be any suitable devices for measuring various environmental qualities that may be correlated to power consumption. The external sensors may be located remotely from the remote measurement device 101, and may measure, for example, temperature, humidity, pressure, wind speed, wind direction, and solar load. The external sensors 305 may be battery powered, or may use energy harvesting methods for power. In addition to environmental measurements, the external sensors 305 may perform additional voltage and current measurements of other electrical nodes. Data gathered by the external sensors 305 may be transmitted to the remote measurement device 101 through wireless signals 307 received by the low power wireless communications device 306.

The remote measurement device 101 may connect to the server system 107 at power up. At periodic intervals, the remote measurement device 101 may send status messages to the server system 107. At other intervals, the remote measurement device 101 may send stripchart interval data for various measured quantities, such as, for example, RMS voltage over a certain averaging period, to the server system 107. The measurements may be checked, for example, every second, for alarm or event conditions. If the remote measurement device 101 detects an alarm or event condition, an alarm or event notification may be sent to the server system 107. Alarm conditions may be based on crossing high or low voltage thresholds, including effects of hysteresis and minimum period past threshold. Events that trigger an event notification may include loss of power, loss of cellular signal, and so on. Optionally, the remote measurement device 101 may enter a "burst mode", where fast real-time updates may be sent for a preprogrammed amount of time. The remote measurement device 101 may be able to synchronize with a time server, such as those hosted by NIST.

The remote measurement device 101 may be capable of 3-phase measurements. In this case, the remote measurement device 101 may include three voltage inputs 102 and, optionally, three current inputs. The compression scheme used by the remote measurement device 101 when transmitting RMS voltage and other data may take advantage of correlations among the voltage and current channels. The remote measurement device 101 may also measure power and other parameters derived from voltage and current readings, and use further correlations among these readers when compressing the data.

The server system 107 may group three individual single-phase, i.e., one channel, remote measurement devices 101. This logical grouping of three of the remote measurement devices 101 may be used to emulate a 3-phase remote measurement device 101. The individual RMS voltage data from the three remote measurement devices 101 may be used to compute 3-phase voltage unbalance, and other 3-phase parameters, for storage in the database 401. The three remote measurement devices 101 may be installed on separate phases, but on the same distribution circuit, so they are electrically "close" together.

Figure 4:
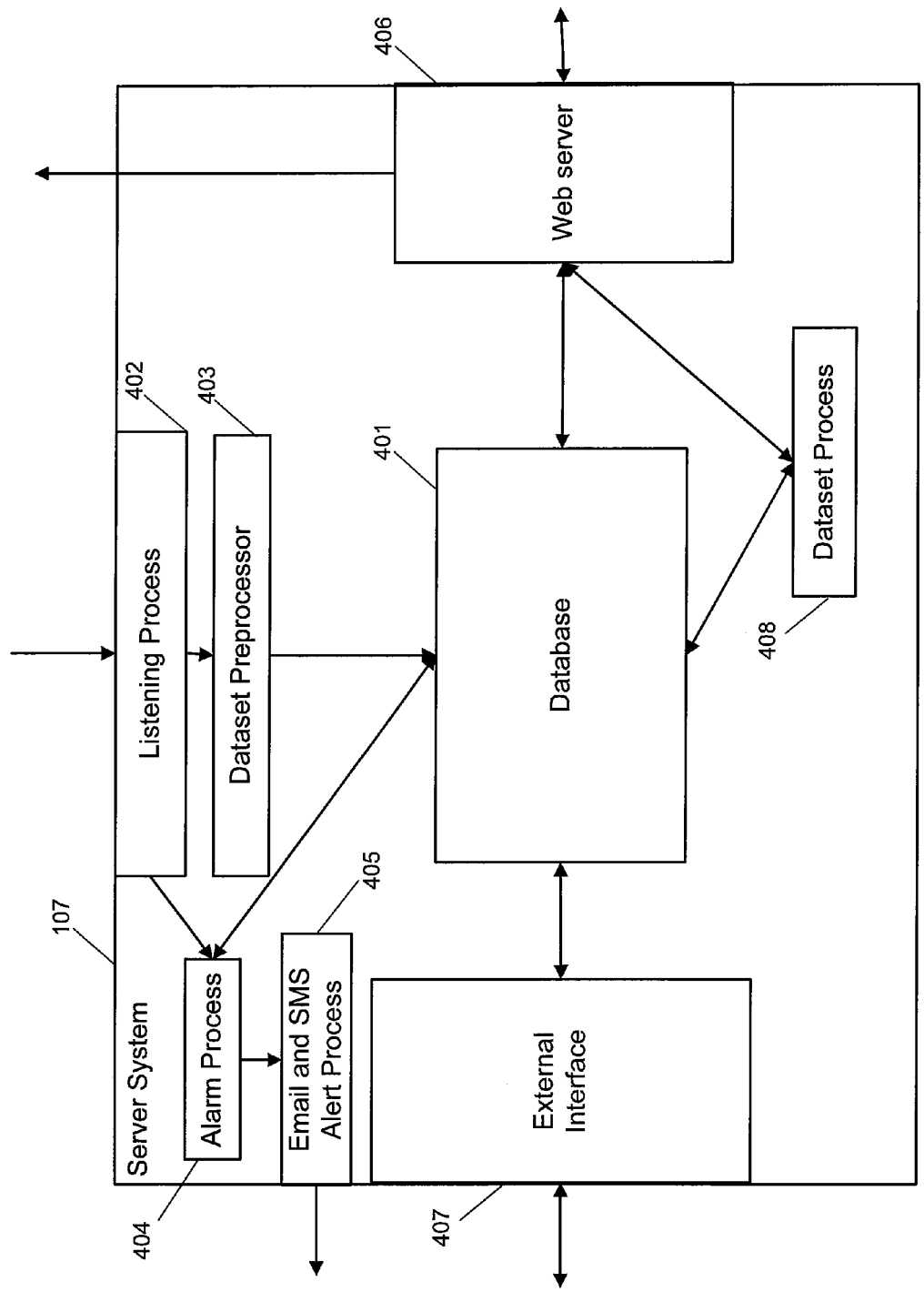
FIG. 4 depicts an exemplary diagram of a server system.

FIG. 4 depicts an exemplary diagram of a server system. The server system 107 may be any suitable combination of hardware and software, and may include a database 401, a listening process 402, a dataset preprocessor 403, an alarm process 404, an email and SMS alert process 405, a web server 406, an external interface 407, and a dataset process 408. For example the server system 107 may be a combination of specialized server computing hardware and software. The server system 107 may be connected to the network 106, which may be, for example, the Internet.

The database 401 may be any suitable combination of hardware and software for implementing a database. The database 401 may be implemented on the same hardware as the rest of the server system 107, or may be implemented on separate hardware connected to the server system 107. The database 401 may store the data sent to the server system 107 from the remote measurement devices 101. The data may be stored database 401 in chunks, which may be, for example, 240 to 1800 data points long. The data may be chunked in the remote measurement device 101, for example, by the microprocessor 304, and received and stored in the database 401 with that chunk size, or a process on the server system 107, for example, the dataset preprocessor 403, may accumulate incoming data, and resize the chunks to the desired chunk size. Chunking the incoming data from the remote measurement devices 101 may allow for increased database performance by avoiding performing an insert operation on the database 401 for each received data point. The chunks may be stored with a timestamp and chunk length.

The database 401 may also store the data as decimated stripchart data. For example, if a graph of one year's worth of stripchart data, including one-second averages, is desired, a large number of points may be returned: 86400×365=31 million points. If this is graphed on a normal sized display, such as, for example, a 1024 pixel wide graph, each pixel column in the x-axis may have over 30,000 points, and thus each point may not be visible. Instead of returning all 31 million points, it may suffice to just return two sets of reduced-resolution traces. In this case, a decimation factor of 4096 may be used, resulting in two traces of 7500 points. Each of those "points" may cover 4096 actual stripchart points. One trace may be a time series of the maximum values of each set of 4096 points, and one trace may be the minimum values. These two traces may be sent to the requesting application, and graphed. The graph may be rendered by drawing a line from the 1st point's maximum value, to that point's minimum value, then to the next point's maximum value, at most one pixel over on the x-axis, and so on. This graph would may be visually identical to graphing the original 31 million point dataset, and may still show the absolute maximum and minimum values, no matter how far out the graph is zoomed. If a user zooms in on the graph, a new decimated stripchart may be returned. If the requested points are small enough, a different decimation level may be used, or none at all.

One decimation strategy may be, for example, to use factors of 16. The raw chunked data may be stored normally in the database 401. The data may then be decimated by a factor of 16, and the maximum/minimum values may be stored. For example, for every 16 points in a chunk, a maximum value and minimum value may be stored. These values may also be stored in chunks in the database 401. The decimated data may then be further decimated by a factor of 16, and so on. For example, as many as 8 levels of 16× decimation may be required. When a stripchart request is received, a start time and end time may be received. A process on the server system 107, such as, for example, the dataset process 408, may compute the appropriate decimation level such that a suitable number of points are returned. The number of points returned may be large enough so that the graph of maximum/minimum values may be visually identical to the full dataset plot, but no larger, which may minimize the amount of data transferred.

The decimated stripcharts may be computed as the data is received by the server system 107, for example, by the dataset preprocessor 403, and then sent to the database 401 in realtime, or an offline batch process may retrieve the raw data from the database 401, decimate it, and store it back in the database 401. Alternatively, the data may be stored in the database 401 without decimation, and decimation may performed as necessary when data is requested from the database 401. This may allow the sending of the smaller sets of data provided by decimation, without having to maintain a decimated database 401.

Usage logs may be kept, which may be used to identify which graphs and reports are most likely to be accessed. Graphs and reports identified as likely to be accessed later may be pre-rendered by an offline batch processor.

The listening process 402 may be any suitable combination of hardware and software, such as, for example, back-end software running on a general purpose CPU in the server system 107. The listening process 402 may receive the data sent from the remote measurement devices 101, and may parse the incoming data packets and, if necessary, decompress stripchart and other data. The listening process 402 may pass the incoming data to the dataset preprocessor 403 and the alarm process 404.

The dataset preprocessor 403 may be any suitable combination of hardware and software. The dataset preprocessor 403 may receive data from the listening process 402, and may perform point chunking, and decimation, as described above, and may insert the data into the database 401 in any suitable manner. For example, data may be inserted into the database 401 directly after being processed through the dataset preprocessor 403, or raw and decimated stripchart buffers may be kept in memory, and when the desired chunk size reached, written to the database 401.

The alarm process 404 may be any suitable combination of hardware and software for detecting alarm conditions, and may be separate from the database 401, or may be implemented within the database 401 using database triggers and stored procedures. The alarm process 404 may receive raw data from the listening process 402, and may parse the data looking for alarm and event messages from the remote measurement devices 101. If the alarm process 404 finds an alarm trigger condition in the data, the database 401 may be queried for what action to take. The alarm process 404 may also cache the alarm status of each remote measurement device 101, the latest status values, and the latest real-time analog readings. These cached values may be used to feed the web server 406, to avoid excessive queries to the database 401.

The email and SMS alert process 405 may be any suitable combination of hardware and software for transmitting alert communications from the server system 107. The email and SMS alert process may be triggered by the alarm process 404, and may optionally include querying the database 401 to determine the correct distribution list for a specific alarm condition. The email and SMS alert process 405 may send out alerts, for example, using email and SMS messages, when notified of an alarm condition or event message by the alarm process 404. Email alerts may be formatted, and may include text or graphical data displays, and URLs which load web content.

The dataset process 408 may be any suitable combination of hardware and software for retrieving and processing data from the database 401. When a stripchart request is received from, for example, the web server 406, the dataset process 408 may query the database 401 for the necessary chunks needed to build the desired stripchart data. The dataset process 408 may retrieve the chunks, and reconstruct the data for the desired interval using the chunked data. The dataset process 408 may also be used to generate reports and graphs using the retrieved data.

The web server 406 may be any suitable combination of hardware and software for hosting a web page. The web server 406 may host a web front-end, such as, for example, a web page accessible through the Internet, which may act as a user interface for the demand management monitoring system. The web server 406 may be accessible over the network 106 to any suitable computing device 108, such as, for example, a personal computer or smartphone. The web server 406 may be able retrieve data as necessary from the database 401, for example, using the dataset process 408, and may be able to communicate with the remote measurement devices 101, allowing the remote measurement devices 101 to be controlled through the computing device 108.

Figure 5:
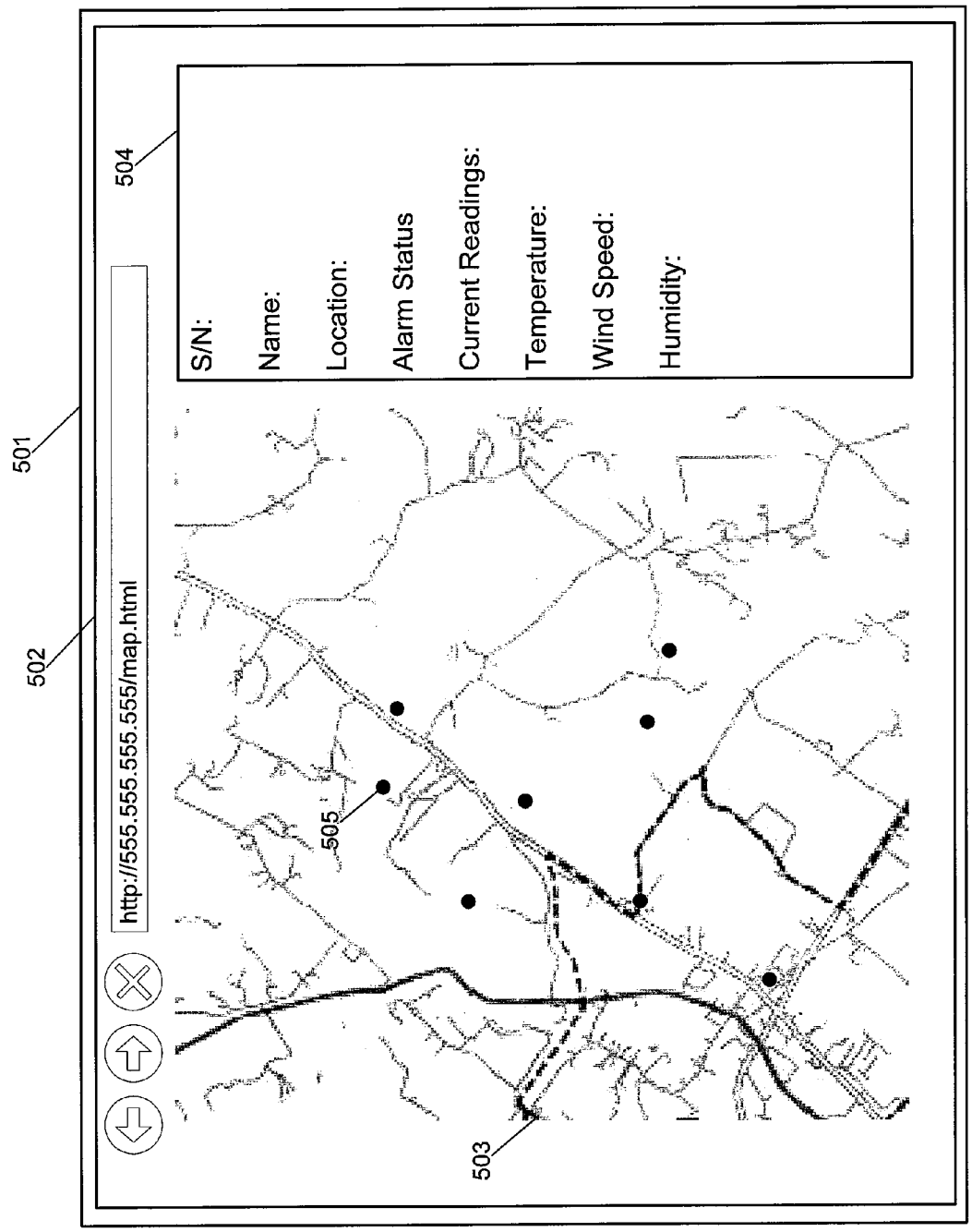
FIG. 5 depicts an exemplary web front end.

FIG. 5 depicts an exemplary web front-end. The web front-end may be a web page 502, displayed in a web browser window 501. The web browser window 501 may be part of any suitable web browsing software. The web page 502 may include a map 503, with markers, such as, for example, the marker 505, locating the remote measurement devices 101. Information about the remote measurement devices 101, such as, for example, current alarm status, serial number, name, current readings, and current environmental measurements, may be displayed using graphical icons and indicators on the web page 502, for example, in information sidebar 504. Information may also be displayed in any other suitable manner, for example, in a pop-up window or on a separate screen after selecting the marker 505 for one of the remote measurement devices 101 on the map 503. The information displayed and the manner in which the information is displayed may be settable by users, with the specific parameters pulled from the database 401. For example, clicking on the marker 505 may pop up a display window showing real time readings. The user may click to start "burst mode", which may causes the web server 406 to send a request to the remote measurement device 101 to start sending real-time updates. In this mode, the web page 502 may display continuous real-time readings, while burst mode lasts.

The locations of the remote measurement devices 101 may be entered manually, for example, by dragging the markers 505 on the map 503, acquired from an on-board GPS, or computed from cell tower location information gathered from the remote measurement devices 101.

The map 503 may also be integrated with other geographic information or overlays. This may include weather or environmental overlays, such as, for example, temperature, humidity, and so on, acquired from the remote measurement devices 101 or from other weather sources, GIS asset data from electric utilities, such as, for example, pole locations, substation locations, and so on, or any other suitable overlays. These overlays may be configured by the user.

The web page 502 may be used to request the generation of reports, such as, for example, basic HTML reports. Using the web page 502, the user may request a report, which may cause the web server 406 to invoke a process on the server system 107, such as, for example, the dataset process 408, which may query the database 401 for the values needed for the specific report, render it in HTML, and display the report to the user on the web page 502. Optionally, the report may be rendered as a PDF, Excel spreadsheet, or any other suitable format. The look and feel of the report may be customized, for example, with a company logo, header, footer, and so on, by the user. Users may also create reports by writing suitable code, with knowledge of the database schema used by the database 401. Reports may also be created with a graphical wizard or a drag and drop scheme.

Graphs of any time series data in the database 401 may be displayed on the web page 502. A process on the server system 107, such as, for example, the dataset process 408, may be invoked by, for example, an AJAX call, and may access the stripchart data, including dechunking and appropriate decimation, from the database 401 and return the data as a JSON object to the web browser 501. Javascript code in the web browser 501 may then render the graph on a canvas object for display on the web page 502. Flash, JAVA, or PC client code implementations may also be used.

Graphs may be customized, including customized trace colors and properties, annotations, markers, and so on. Stripchart information from one of the remote measurement devices 101 can be added or removed from the graph dynamically, for example, by dragging the marker 505 for the remote measurement device 101 from the map to the graph, or by dragging a trace for the remote measurement device 101 back off the graph. A custom view or annotated graph may be saved in the database 401 for later recall, or saved as a URL which may be bookmarked, or sent to other users.

The external interface 407 may be any suitable combination of hardware and software for interfacing with the external utility systems 109. For example, the external interface 407 may include a DNP3 interface to an electric utility SCADA system. The external interface 407 may act as a DNP3 gateway, and may respond to DNP3 polls and requests by returned the appropriate data from the database 401, duplicating the responses the remote measurement devices 101 would have sent if the remote measurement devices 101 implemented the DNP3 protocol. If an alarm or event is received from the remote measurement devices 101 by the server system 107, a corresponding unsolicited message may be sent through the external interface 107 to the external utility system 109, for example, using DNP3 to send a message to a SCADA system. The external interface 107 may emulate the performance of a system where the remote measurement devices 101 had direct links to the external utility system 109, such as, for example, DNP3 links directly to a SCADA system.

Alternatively, the remote measurement device 101 may interface directly with the external utility system 109, for example, using DNP3 or any other suitable protocol, while simultaneously interfacing with the server system 107. The remote measurement device 101 may send compressed block data to the server system 107, and also send telemetry data to the external utility system 109, for example, through the SCADA system, as requested by the SCADA master controller. The remote measurement device 101 may be able to send alerts and alarm conditions through either interface. The remote measurement device 101 may also only interface with the external utility system 109, and there may be no server system 107.

Figure 6:
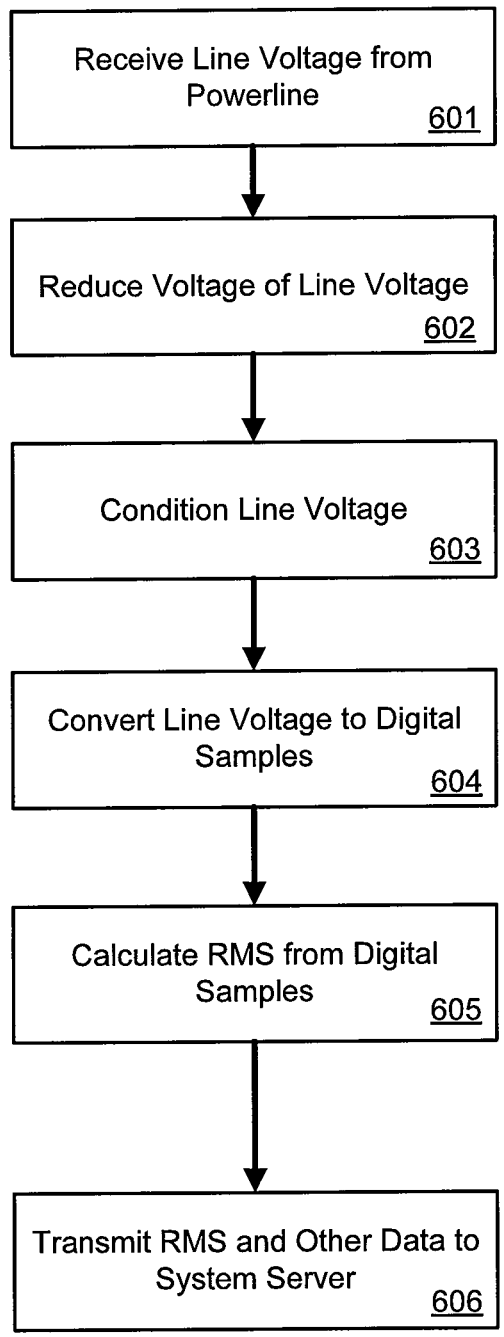
FIG. 6 depicts an exemplary procedure for operating a remote measurement device.

FIG. 6 depicts an exemplary procedure for operating a remote measurement device. In block 601, a line voltage may be received from a powerline. For example, the powerline 103 may be connected to the voltage input 102 of the remote measurement device 101.

In block 602, the voltage of the line voltage may be reduced. For example, the front end device 101 may have a voltage reducer 301, such as a transformer or a pulse-withstanding divider resistor, connected to the voltage input 102. The line voltage may pass through the voltage reducer 301 and end up with a reduced voltage.

In block 603, the line voltage may be subject to signal conditioning. After being reduced in voltage, the line voltage may be conditioned in any suitable manner by the signal conditioning circuit 302. For example, the line voltage may be run through a low-pass filter.

In block 604, the line voltage may be converted into digital samples. For example, the remote measurement device 101 may have the A/D converter 303 connected to the signal conditioning circuit 302. After the voltage of the line voltage has been reduced and conditioned, the line voltage may be digitized by the A/D converter 303 and output as a digital signal with digital samples.

In block 605, the RMS voltage of the line voltage may be calculated based on the digital samples of the line voltage. For example, after the A/D convertor 303 converts the line voltage to digital sample, the digital samples may be fed into the microprocessor 304. The microprocessor 304 may use any suitable algorithm for calculating RMS voltage based on the digital samples. The microprocessor 304 may also receive other data, for example, from the external sensors 305, which may be used in the calculation of RMS voltage, or may be packaged along with the RMS voltage data for transmission to the server system 107. Alert or event messages may also be generated by the microprocessor 304, as appropriate, and sent along with the RMS voltage and other data.

In block 606, the RMS voltage and other data may be transmitted to a server system. For example, the microprocessor 304 may send the RMS voltage and other data to the wireless communications device 104. The wireless communications device 104 may communicate with the network 106 with wireless signal 105. The RMS voltage and other data may be routed through the network 106 to the server system 107, where the data may be received by, for example, the listening process 402. The RMS voltage and other data may be compressed, and may be sent using a low data rate telemetry plan. For example, the RMS voltage and other data may be compressed a compression rate of up to 30:1 using differential and arithmetic compression techniques. The compression algorithm and chunk size of the data may be adjustable, in order to allow for fine-tuning of the system to keep the data transfer as small as possible.

Figure 7:
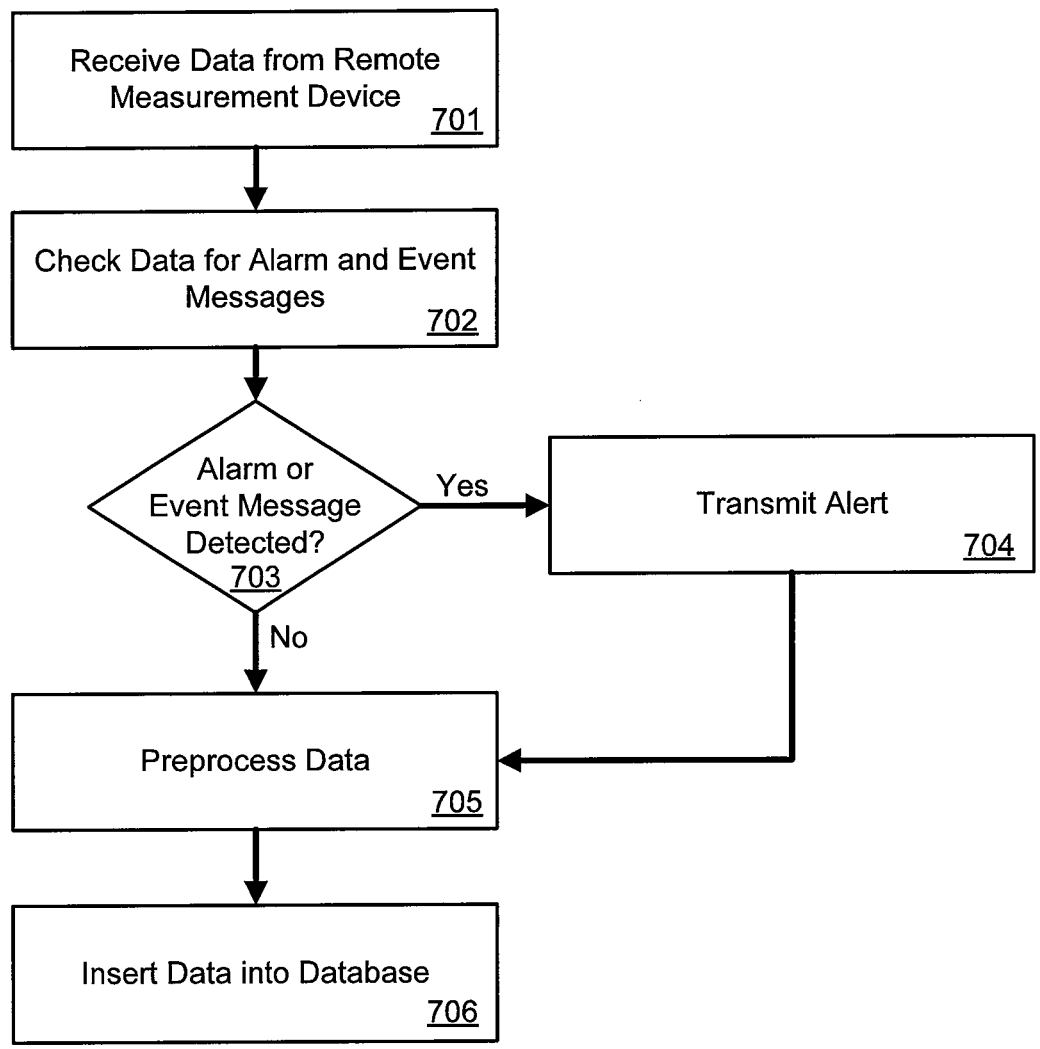
FIG. 7 depicts an exemplary procedure for receiving data from a remote measurement device at a server system.

FIG. 7 depicts an exemplary procedure for receiving data from a remote measurement device at a server system. In block 701, data from a remote measurement device may be received. For example, data, including RMS voltage and other data, sent from the remote measurement device 101 may be routed through the network 106 to the server system 107. The listening process 402 may receive the data.

In block 702, the data may be checked for alarm and event messages. For example, the listening process 402 may send the data to the alarm process 404, and the alarm process 404 may determine if the data includes any alarm or event messages.

In block 703, if an alert or event message is detected in the data, flow proceeds to block 704, otherwise flow proceeds to block 705.

In block 704, an alert may be sent out. For example, if the alarm process 404 determines that the data includes an alert or event message, the alarm process 404 may trigger the email and SMS alert process 405, which may transmit an alert. The alert may be transmitted by email, SMS, or using any other suitable manner of communication. The email and SMS alert process 405 may check the database 401 to determine what kind of message to transmit based on the alert or event message that was found in the data.

In block 705, the data may be preprocessed. For example, the listening process 402 may send the data to the dataset preprocessor 403, where the data may be decimated and chunked, as described above. Any other preprocessing may also be preformed, such as, for example, correlating the RMS voltage data with the other data, including, for example, data from the external sensors 305.

In block 706, the data may be inserted a database. For example, after the data has been preprocessed by the dataset preprocessor 403, the processed data may be inserted in the database 401 for long term storage and retrieval.

Figure 8:
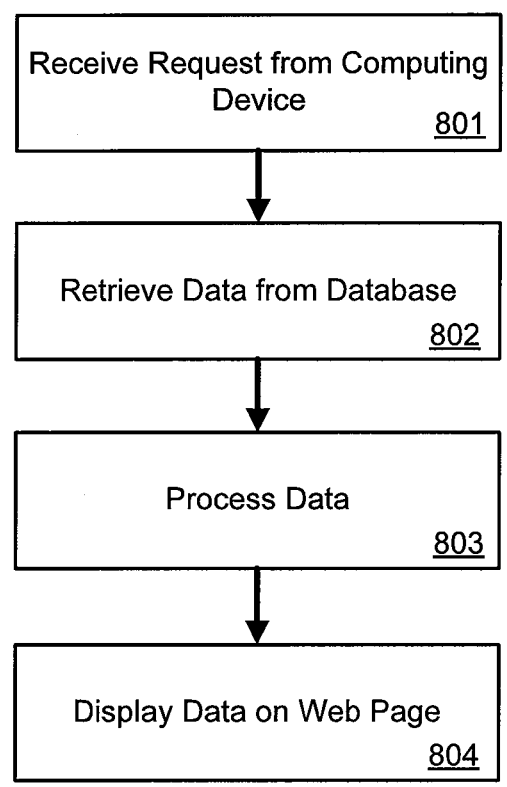
FIG. 8 depicts an exemplary procedure for operating a web server on the server system.

FIG. 8 depicts an exemplary procedure for operating a web server on the server system. In block 801, a web server on a server system may receive a request from a computing device. For example, a user using the computing device 108 may use the web browser 501 to navigate to the web page 502, which may display the map 503 and data on the remote measurement devices 101. The request from the computing device 108 for the web page 502 and the data displayed on the web page 502 may be transmitted through the network 106 to the server system 107, where the web server 406 may receive the request.

In block 802, data may be retrieved from a database in response to the request for data. For example, the web server 406 may invoke the dataset process 408, which may retrieve the requested data from the database 401.

In block 803, the data may be processed. For example, the dataset process 408 may process the data, for example, by decimating data that has not already been decimated, and converting the data into a report or graph suitable for display on the web page 502. The web server 407 may also process the data, for example, correlating the data with the marker 505 for the appropriate remote measurement device 101 on the map 503.

In block 804, the data may be displayed on the web page. For example, the data may be displayed on the web page 502 in the web browser 503, so that the user may view and interact with the data on the computing device 108. Displaying the data may include displaying the map 502, displaying the information sidebar 504, displaying the data in pop-up windows, or in graph or report form.

Figure 9:
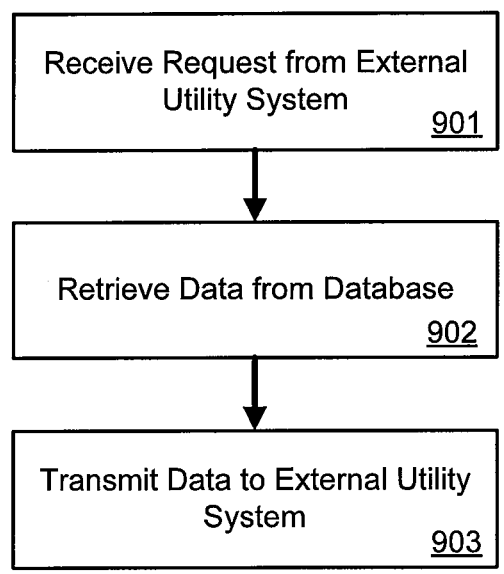
FIG. 9 depicts an exemplary procedure for operating an external interface on the server system.

FIG. 9 depicts an exemplary procedure for operating an external interface on the server system. In block 901, an external interface on a server system may receive a request from an external utility system. For example, the external utility system 109 may request data from the remote measurement devices 101. The request may be routed through the network 106 to the server system 107, where it may be received by the external interface 407.

In block 902, the requested data may be retrieved. For example, the external interface 407 may retrieve the data requested by the external utility system 109 from the database 401. The external interface 407 may not process the data, so that the data will appear to the external utility system 109 as if it came directly from the remote measurement devices 101, instead of from the server system 107, rendering the server system 107 transparent to the external utility system 109.

In block 903, the data may be sent to the external interface. For example, the external interface 407 may transmit the data retrieved from the database 401 to the external utility system 109. The data may appear to the external utility system 109 to have been transmitted directly from the remote measurement devices 101.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

The invention is claimed as follows:

1. A method for a server system in a demand management monitoring system comprising:
   receiving data comprising RMS voltage data;
   checking the data for alarm or event messages;
   inserting the data into a database;
   displaying a map on a web page, wherein the map comprises at least one marker indicating a location of at least one remote measurement device;
   retrieving a portion of the data related to the at least one remote measurement device from the database; and
   displaying the portion of the data on the web page.

2. The method of claim 1, further comprising:
   transmitting at least one of an email and an SMS alert when an alarm or event message is found in the data.

3. The method of claim 1, further comprising:
   preprocessing the data before inserting the data into the database, wherein the preprocessing comprises at least one of decimating the data and chunking the data.

4. The method of claim 3, wherein decimating the data further comprises:
   decimating the data by factors of 16.

5. The method of claim 1, further comprising:
   receiving a request for a portion of the data;
   retrieving the portion of the data from the database;
   processing the portion of the data for display; and
   displaying the portion of the data on the web page.

6. The method of claim 5, wherein processing the data comprises at least one of converting the data into a graph and converting the data into a chart.

7. The method of claim 1, further comprising:
   receiving a request for a portion of the data from an external utility system;
   retrieving the portion of the data from the database; and
   transmitting the portion of the data to the external utility system.

8. The method of claim 1, further comprising:
   receiving an instruction for at least one remote measurement device through a web page; and
   transmitting the instruction to the at least one remote measurement device.

9. The method of claim 1, wherein the data further comprises environmental data.

10. The method of claim 1, further comprising:
    overlaying the map on the web page with environmental data.

11. The method of claim 10, wherein the environmental data comprises at least one of the following: temperature and humidity.

* * * * *